3,487,081
6-(AMINOPHENYL)-3-PYRIDAZONES AND
THEIR PRODUCTION
Gerhard Bachmann, Ludwigshafen (Rhine), Germany, assignor to Badische Anilin- & Soda-Fabrik Aktiengesellschaft, Ludwigshafen (Rhine), Germany
No Drawing. Filed Jan. 3, 1967, Ser. No. 611,526
Claims priority, application Germany, Jan. 7, 1966, B 85,311
Int. Cl. C07d 51/04
U.S. Cl. 260—250     4 Claims

ABSTRACT OF THE DISCLOSURE

A class of 6-(aminophenyl)-3-pyridazones which may bear substituents on the amino group and/or on the phenyl nucleus as set forth by the structural Formula I below and a process for preparing such compounds by dehydrogenating the corresponding dihydropyridazones of the Formula II below. The new compounds are useful intermediates, e.g. in the preparation of dyes.

---

This invention relates to new pyridazone derivatives and to a novel process for the production of the new pyridazone derivatives which have the general Formula I:

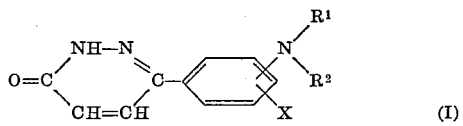

where X is hydrogen, halogen or an alkyl or alkoxy group and $R^1$ and $R^2$ each denotes hydrogen or an alkyl group, the alkyl groups in the substituents in turn bearing halogen atoms or hydroxyl groups if desired.

Pyridazones are important intermediates for the synthesis of, for example, dyes and pharmaceuticals.

It is known that compounds of this type may be prepared by the dehydrogenation of the corresponding 4,5-dihydropyridazones, bromine being used as the dehydrogenating agent (see for example J. Am. Chem. Soc., 75, p. 1117). This process is uneconomical, and it is particularly unsatisfactory because the bromine acts not only as a dehydrogenating agent but also as a brominating agent, so that the yields of the desired non-brominated products are reduced and the products are difficult to prepare in pure form. This holds particularly for dihydropyridazine derivatives containing radicals in the molecule that readily undergo bromination.

It is the object of the present invention to provide the new pyridazones (I) as well as an industrially useful process for their production.

I have found that pyridazine derivatives (I) are obtained in readily isolable form and excellent yields by dehydrogenating dihydropyridazones of the general Formula II:

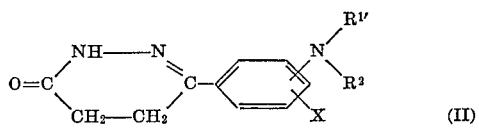

where $R^{1'}$ is $R^1$ or an aliphatic or aromatic acyl group by using as the dehydrogenating aromatic nitrosulfonic acids (III) or salts thereof, the molar ratio of the nitro groups in (III) to (II) being at least 0.5:1 to ensure complete reaction.

I have further found that the reaction is particularly successful when it is carried out at a temperature between 50 and 100° C. in aqueous alkaline medium by means of water-soluble compounds (III).

The starting compounds (II) which are suitable for the process of the invention and are also new may be obtained in conventional manner from the corresponding ω-(aminobenzyl) propionic acids and hydrazine hydrate.

Examples of substituents X in the compounds (II) are hydrogen, chlorine, bromine, alkyl groups having from 1 to 12 carbon atoms and alkoxy groups having from 1 to 3 carbon atoms. Examples of $R^{1'}$ are hydrogen, alkyl groups and aliphatic and aromatic acyl groups having from 1 to 12 carbon atoms and $R^2$ is hydrogen or alkyl having from 1 to 4 carbon atoms. The organic radicals in these substituents may in accordance with the definition given above, bear hydroxyl groups or halogen atoms as substituents. For example, $R^1$ and/or $R^2$ can be 2-hydroxyethyl, 2-chlorethyl, 3-hydroxypropyl and 3-chlorpropyl.

Examples of starting compounds II are 6-(3-aminophenyl) - 4,5-dihydropyridazone-3, 6-(4-aminophenyl)-4,5-dihydropyridazone-3, 6-(2-chloro - 4 - aminophenyl)-4,5-dihydropyridazone-3, 6-(2-amino - 5 - methylphenyl)-4,5 - dihydropyridazone-3 as well as the derivatives thereof acetylated or benzolated on the amino nitrogen.

Suitable dehydrogenating agents (III) are nitrobenzenesulfonic acids and nitronaphthalenesulfonic acids having up to three nitro groups and/or up to three sulfo groups and particularly the alkali and ammonium salts of the said acids or technical mixtures thereof.

The reaction is expediently carried out in aqueous alkaline medium, approximately 10 parts by weight of water being used for each part by weight of (II). As the reaction proceeds, the pyridazone (I) which has formed and which usually exhibits appreciably higher water solubility than (II) passes into solution. The usually brown solution is allowed to cool and is then neutralized, the desired reaction product crystallizing out. The yields almost invariably exceed 75%. When using an essentially non-aqueous, e.g. alcoholic, phase, lower yields are usually obtained.

The products obtainable according to the process are valuable intermediates for organic synthesis, especially dyes.

The invention is further illustrated by the following examples.

EXAMPLE 1

6-(4-aminophenyl)-pyridazone-3

A mixture of 100 g. of 6-(4-acetylamino)-4,5-dihydropyridazone-3, 80 g. of sodium 3-nitrobenzene sulfonate, 50 g. of sodium hydroxide and 1,500 ml. of water is heated for 2 hours at 100° C. A clear brown solution is formed from which pale yellow crystals of 6-(4-aminophenyl)-pyridazone-3 (M.P. 290° C.; from water, 292–299° C.) are obtained on cooling and neutralization with concentrated hydrochloric acid.

Analysis (calculated figures in brackets): 63.8 (64.1) percent C; 5.0 (4.8) percent H; 22.5 (22.4) percent N.

EXAMPLE 2

6-(3-aminophenyl)-pyridazone-3

This substance is prepared from 167 g. of 6-(3-aminophenyl)-4,5-dihydropyridazone-3, 100 g. of sodium 3-nitrobenzene sulfonate, 50 g. of sodium hydroxide and 1,000 ml. of water in a 78% yield. M.P. (from water) 200° C.

Analysis (calculated figures in brackets): 64.1 (64.1) percent C; 5.0 (4.8) percent H; 22.5 (22.4) percent N.

Similar results are obtained by using, instead of sodium 3-nitrobenzene sulfonate, equivalent amounts of the sodium salt of 5-nitronaphthalene-1-sulfonic acid or of a technical mixture of 4-, 5- and 8-nitronaphthalene-1-sulfonic acids.

I claim:
1. A compound of the formula

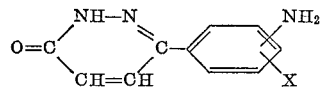 (I)

wherein X denotes a member selected from the class consisting of hydrogen, methyl and chlorine.

2. The compound of claim 1 identified as 6-(4-aminophenyl)-pyridazone-3.

3. The compound of claim 1 identified as 6-(3-aminophenyl)-pyridazone-3.

4. A process for the production of a pyridazone derivative of the formula

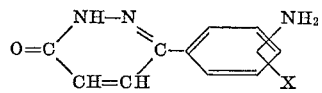 (I)

wherein X denotes a member selected from the class consisting of hydrogen, methyl and chlorine, which process comprises: dehydrogenating at a temperature between 50 and 100° C. in an aqueous alkaline medium a dihydropyridazone having the formula:

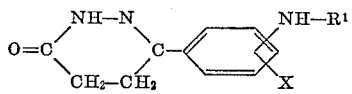 (II)

wherein $R^1$ denotes a member selected from the group consisting of hydrogen and acetyl and X has the same meaning as above, in the presence of a dehydrogenating agent (III) selected from the class consisting of aromatic nitrosulfonic acids and salts thereof, the molar ratio of the dehydrogenating agent (III) to the compound (II) being at least 0.5:1.

References Cited

FOREIGN PATENTS 1,213,841  4/66  Germany.

ALEX MAZEL, Primary Examiner

R. V. RUSH, Assistant Examiner